Dec. 18, 1951  A. F. PITYO ET AL  2,578,835
WELDING UNIT
Filed Oct. 10, 1950  5 Sheets-Sheet 1

INVENTORS
ALBERT F. PITYO,
HARRY E. BUTTERFIELD, JR.
BY
ATTORNEY

INVENTORS
ALBERT F. PITYO,
HARRY E. BUTTERFIELD, JR.

BY

ATTORNEY

Dec. 18, 1951  A. F. PITYO ET AL  2,578,835
WELDING UNIT
Filed Oct. 10, 1950  5 Sheets-Sheet 3

INVENTORS
ALBERT F. PITYO,
HARRY E. BUTTERFIELD, JR.
BY
ATTORNEY

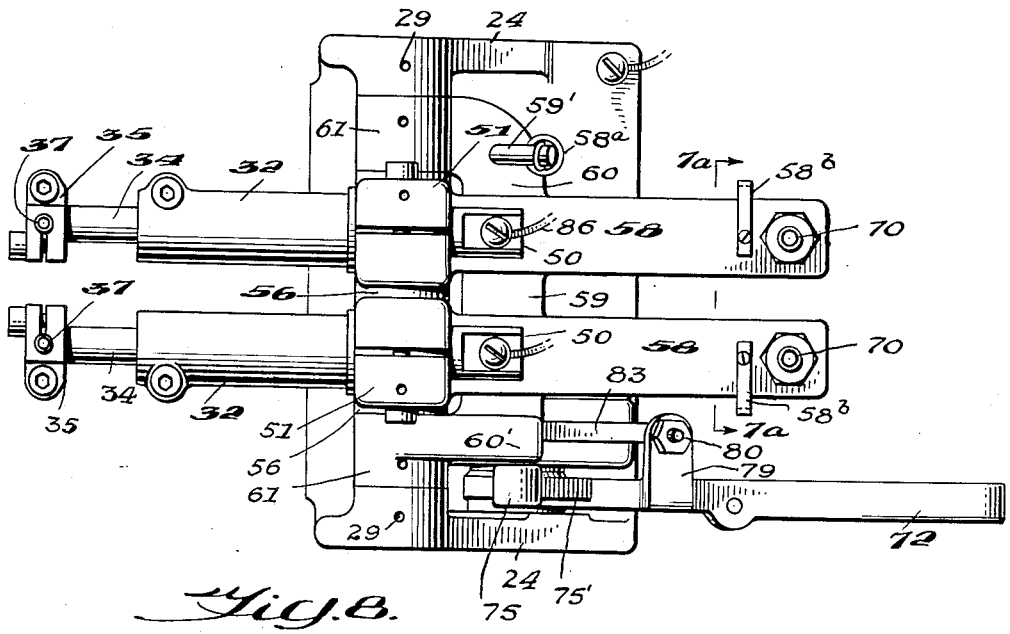
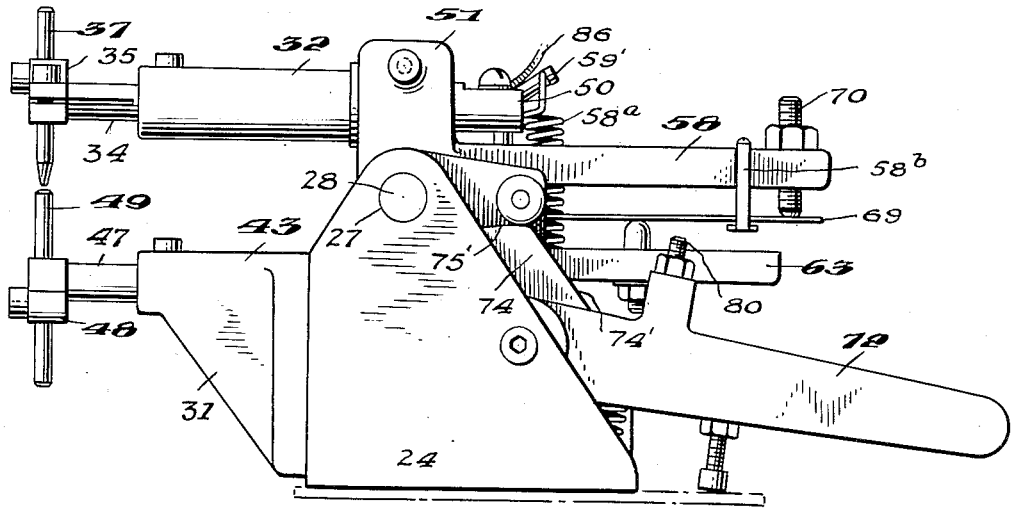

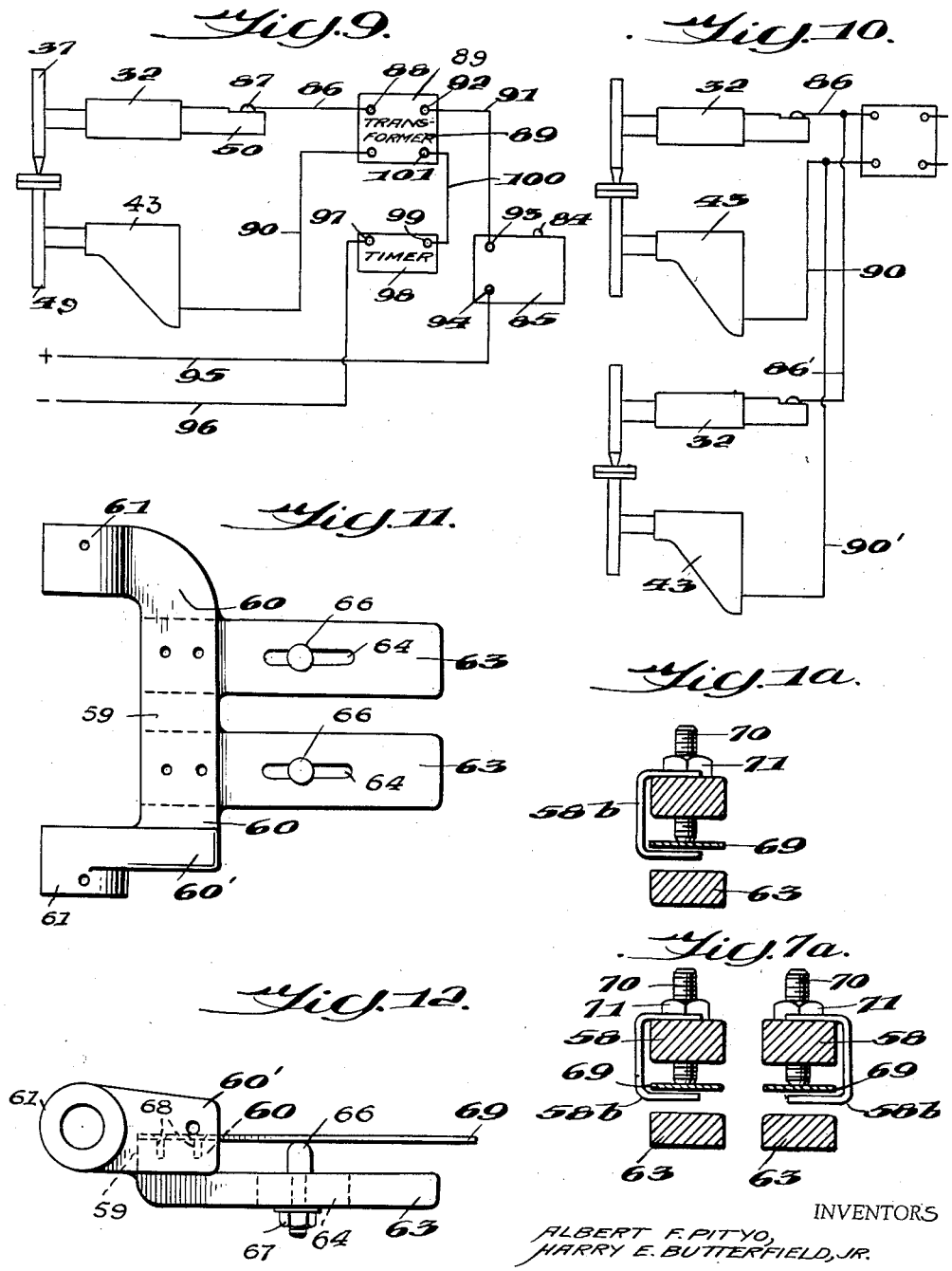

Patented Dec. 18, 1951

2,578,835

UNITED STATES PATENT OFFICE 2,578,835

WELDING UNIT

Albert F. Pityo, Clifton, and Harry E. Butterfield, Jr., Maplewood, N. J.

Application October 10, 1950, Serial No. 189,456

17 Claims. (Cl. 219—4)

Our invention relates to a welding unit.

An important object of the invention is to provide a unit of the above mentioned character having a large range of adjustment for supplying different degrees of direct pressure to the work between the electrodes.

A further object of the invention is to provide a leaf spring for producing the pressure upon the work between the electrodes, which pressure remains constant, prior to closing the welding circuit.

A further object of the invention is to provide a unit of the above mentioned character for welding small parts and having low inertia, whereby the selected pressure is properly utilized in effecting the welding and such pressure follows through during the welding period.

A further object of the invention is to provide a unit of the above mentioned character which will provide the identical pressure for any number of the same parts being welded.

A further object of the invention is to provide a unit of the above mentioned character which will relieve the operator from fatigue as only a slight manual force is necessary to operate the same.

A further object of the invention is to provide a unit of the above mentioned character which will completely eliminate electrode crawl.

A further object of the invention is to provide a unit which is enclosed within a housing eliminating dust and dirt problems.

A further object of the invention is to provide a unit of the above mentioned character which is sturdy, strong and has ample pivoting surfaces for long life.

Figures 1, 2:
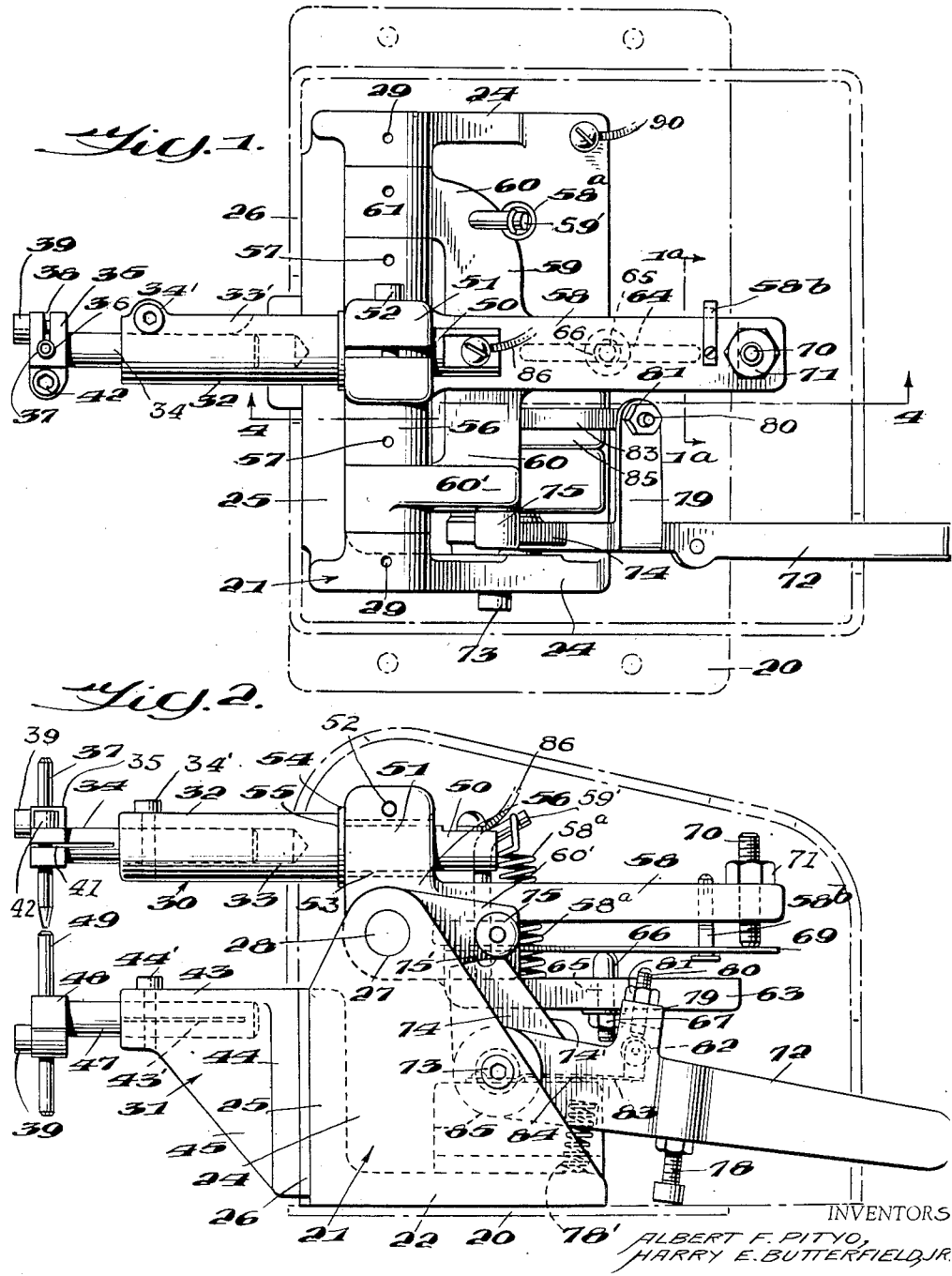
Figure 3:
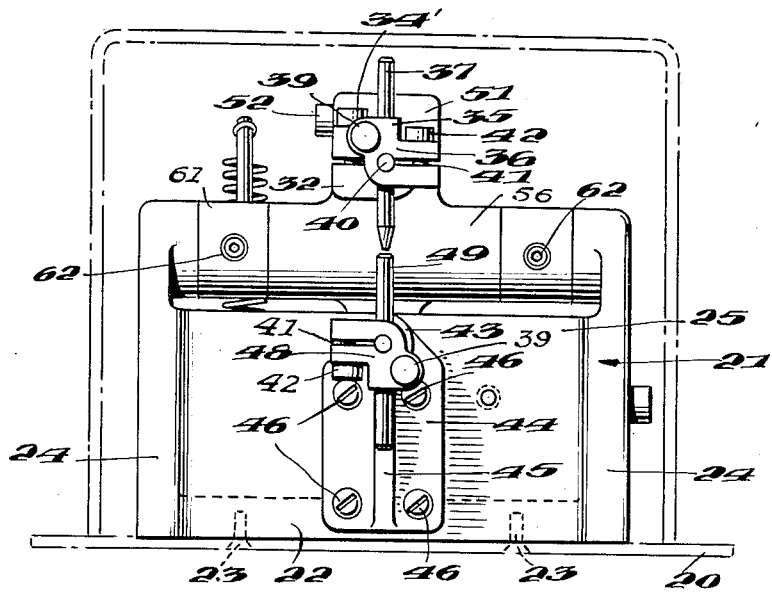
Figure 4:
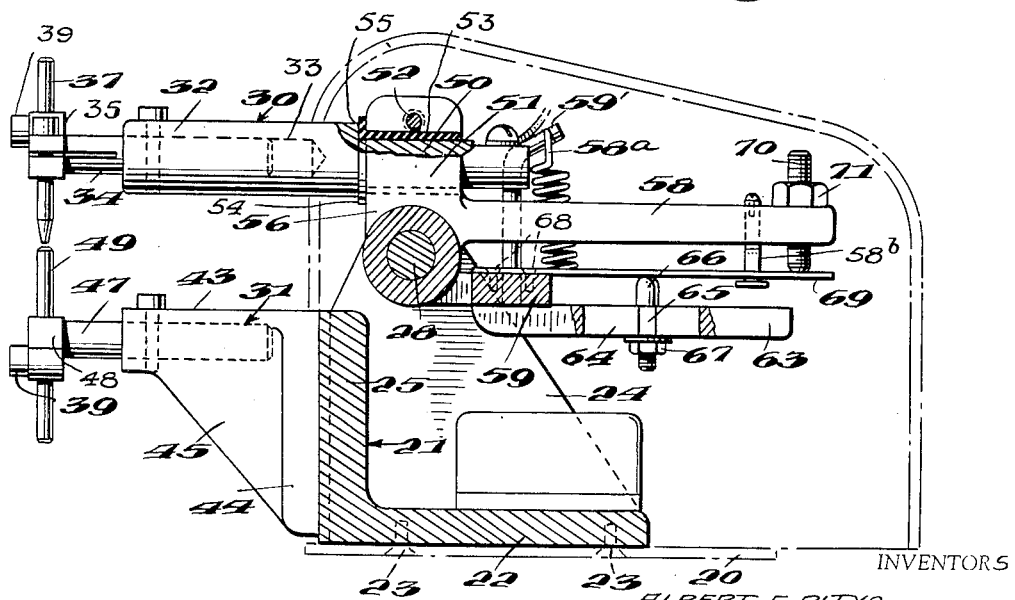
Figure 5:
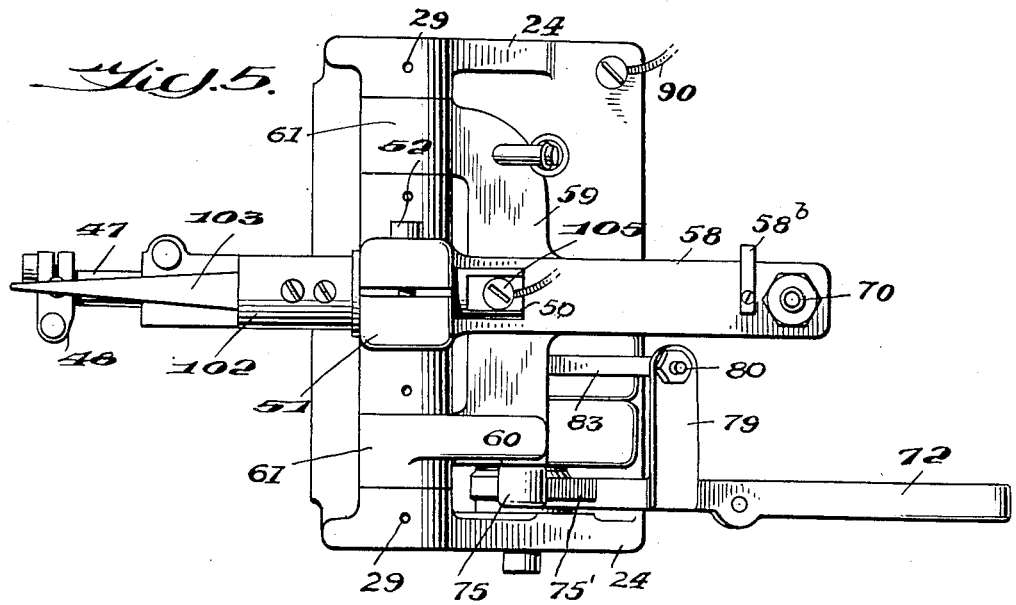
Figure 6:
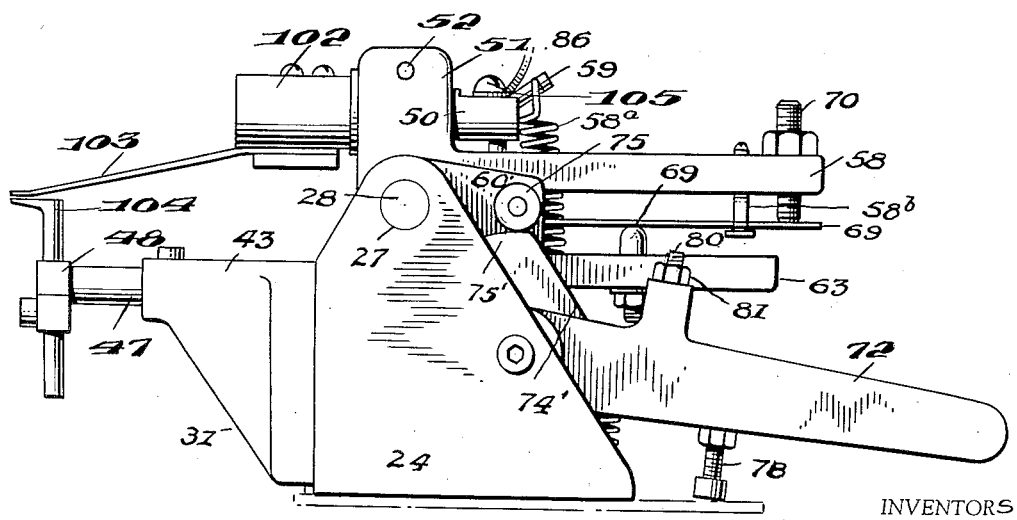

In the accompanying drawings forming a part of this application and in which like numerals are employed to designate like parts throughout same, Figure 1 is a plan view of a machine embodying our invention, the casing being shown in horizontal section, Figure 2 is a side elevation of the machine, the casing being shown in vertical section, Figure 3 is a front elevation of the machine, the casing being shown in vertical section, Figure 4 is a longitudinal section taken on line 4—4 of Figure 1, Figure 5 is a plan view of a machine embodying a modification of the invention, Figure 6 is a side elevation of the same, Figure 7 is a plan view of a machine embodying a second modification of the invention, Figure 8 is a side elevation of the same, Figure 9 is a diagrrammatic view of a welding circuit and associated elements, Figure 10 is a diagrammatic view of a modified form of welding circuit, Figure 11 is a plan view of the yoke and horizontal arms carried thereby, embodied in the form of the invention shown in Figures 7 and 8, Figure 12 is an end elevation of the construction shown in Figure 11, Figure 7a is a transverse section taken on line 7a—7a of Figure 7, and, Figure 1a is a transverse section taken on line 1a—1a of Figure 1.

In the drawings, the numeral 20 designates a horizontal base to be bolted or otherwise rigidly mounted upon a bench. A support 21 is mounted upon the base. This support includes a horizontal bottom 22, which may be secured to the base 20 by screws 23 or the like. Formed integral with the bottom 22 are vertical sides 24 and a vertical end 25, having a projection or pad 26. The bottom 22, sides 24 and vertical end 25 form the support 21 having its end opposite the end 25 open. The sides 24 are provided near their tops with horizontal transverse openings 27 for pivotally receiving a shaft 28, and the numeral 29 designates oil holes which lead to the bearings or openings 27.

The numerals 30 and 31 designate upper and lower electrode holders. The upper electrode holder is mounted to swing in a vertical plane while the lower electrode holder is stationary. The upper electrode holder comprises a generally horizontal rod 32, having a cylindrical bore 33 for receiving a shaft 34. The tubular portion of the rod 32 is provided with a longitudinal slot 33', and this slotted portion is equipped with a bolt 34', whereby the shaft 34 may be clamped within the bore 33 or released for adjustment therein. It is thus seen that the shaft 34 may be longitudinally adjusted or turned upon its axis and subsequently locked to the rod 32 in the selected adjusted position by manipulation of the bolt 34'. Formed integral with the outer end of the shaft 34 is a head 35, having a vertical opening 36 for receiving a vertical electrode 37. The head 35 has a vertical slot 38 and the head is equipped with a bolt 39, so that the head may be clamped against the vertical electrode. The head 35 also has a horizontal opening 40, Figure 3, to receive the electrode when such electrode is arranged horizontally and the head has a horizontal slot 41 and a bolt 42 so that the head may have the electrode clamped therein or released for adjustment.

The lower stationary electrode holder comprises a bracket including a horizontal sleeve 43 formed integral with a vertical plate 44 and a diagonal web 45. The plate 44 is rigidly secured to the end 25 by screws 46. The sleeve 43 has a longitudinal slot 43' and the sleeve is equipped with a bolt 44'. A horizontal shaft 47 is adjustably mounted in the sleeve 43 and may be moved longitudinally or turned within the sleeve and then locked in the selected adjusted position within the sleeve by manipulation of the bolt 44'. The shaft 47 carries a head 48, integral therewith. The head 48 is identical with the head 35, but the head 48 is inverted and extends in an opposite direction to the head 35. The head 48 has the same means to hold the lower electrode 49 in the vertical position, as shown, or in the horizontal position.

The rod 32 has a reduced extension 50, clamped within a split collar 51 and this split collar has an adjusting bolt 52. The reduced extension 50 is insulated from the collar 51 by an insulating sleeve 53 and insulating disc 54, engaging a shoulder 55. By tightening up the bolt 52, the reduced extension 50 will be securely locked to the split collar 51. This split collar is formed integral with a horizontal sleeve 56, pivoted upon the shaft 28. The numeral 58 designates a horizontal arm which is preferably formed integral with the sleeve 56. The sleeve 56 has oil holes 57, which lead to the shaft 28.

A yoke is provided, comprising a horizontal transverse tie-bar 59, having ends 60, carrying knuckles or sleeves 61, which are clamped to the shaft 28 by set screws 62. Formed integral with the tie-bar 59 is a lower horizontal arm 63, arranged beneath and in alignment with the arm 58. The arm 63 is provided with a longitudinal slot 64 for receiving a bolt 65, having a rounded head 66 and carrying a nut 67. This bolt may be adjusted longitudinally of the arm 63 and locked thereto in the selected adjusted position. Arranged between the arms 58 and 63 and secured to the top of the tie-bar 59 by screws 68 or the like, is a leaf spring 69, the lower face of which bears against the head 66. The outer end of the leaf spring 69 engages the lower end of a bolt 70, tapped into the outer end of the arm 58 carrying a lock nut 71.

Arranged inwardly of and near one side 24 is a vertically swinging operating lever 72, the inner end of which is pivotally mounted upon the side 24 by means of a pin or pivot 73. Formed integral with the inner end of the lever 72 and projecting above the same, is a cam 74, arranged beneath and engaging a roller 75, mounted upon the adjacent end 60 through the medium of an extension 60'. The cam 74 has a long inclined or generally radial face 64' and a curved face 75', which is concentric to the pivot 73. It is thus seen that when the lever 72 is swung downwardly, the cam face 74' will engage and raise the roller 75 until the roller passes upon the curved cam face 75'. This upward movement of the roller 75 swings the ends 60 and the tie-bar 59 upwardly, swinging the arm 63 upwardly, raising the arm 58, through the medium of the leaf spring 69, contacting with the bolt 70 and head 66. The length of the leaf spring 69 to be flexed, is controlled by the position of the head 66, thus regulating the effective stiffness of the leaf spring and the resultant pressure of the electrodes upon the work. This pressure may be widely varied from a few ounces to a number of pounds, such as from 5 ounces to 25 pounds.

The pressure of the electrodes upon the work may also be varied by adjusting the bolt 70. The downward movement of the lever 72 is limited by an adjustable bolt 78, tapped into the lever 72 and arranged to engage the base 20. The lever 72 is moved upwardly by a compressible coil spring 78'. The lever 72 may be manually moved downwardly by any suitable means, such as a treadle arranged at the front of the machine and suitably connected to the rear end of the lever 72.

Secured to the lever 72 is a laterally extending horizontal arm 79, having an adjustable bolt 80 tapped into the arm and carrying a lock nut 81. This bolt is adapted to engage a roller 82, carried by a spring arm 83, to depress a plunger 84 for closing a conventional micro-switch 85. When the switch is closed, a welding circuit is closed and the current discharges. When the lever 72 is in the raised position due to the action of the spring 78', the arm 63 is in the lowered position and the roller 75 is resting upon the inclined cam face 74'. The roller 75 follows the cam face 74' by virtue of a spring 58ª, which is attached to a rod 59', rigidly mounted upon the tie-bar 59. The lower end of the spring 58ª is attached to the bottom 22. This spring 58ª tends to swing the tie-bar 59 and associated elements downwardly. The arm 58 follows the downward movement of the arm 63 by virtue of a U-shaped keeper 58ᵇ, secured to the arm 58 by a screw or the like and the lower side of the U-shaped keeper is arranged beneath the leaf spring 69 to contact therewith but has no connection with the same so that the leaf spring is free to flex upwardly. When the roller 75 travels upwardly upon the inclined cam face 74', the arms 63 and 58 are raised, thus moving the electrodes 37 and 49 into yielding engagement with the work between them, producing the desired pressure. As soon as the roller 75 passes upon the curved cam face 75', there is a dwell in the upward movement of the lever 58 and the selected pressure remains constant. At this time the bolt 80 depresses the roller 82 and the spring arm 83 operates the micro-switch 85 to close the welding circuit and the welding occurs. Any further downward movement of the lever 72 will not further raise the arm 58 or vary the pressure of the electrodes upon the work. It is thus seen that a selected pressure is applied to the work during the welding period and this pressure will remain constant and will follow through during the welding period.

In Figure 9, I have shown a welding circuit. This circuit includes a wire 86 connected to the extension 50 of the rod 32 by a binding post 87. The wire is therefore electrically connected with the upper electrode 37. The wire 86 is connected with one terminal 88 of the secondary winding of a transformer 89 and the opposite terminal of this secondary winding is connected with a wire 90, connected with the sleeve 43 and hence electrically connected with the electrode 49. A wire 91 is connected with the terminal 92 of the primary winding of the transformer and the wire 91 is connected with a terminal 93 of the micro-switch 85, the opposite terminal 94 of which is connected with the wire 95. Lead wire 96 is connected with one terminal 97 of a timer 98, the opposite terminal 99 of which is connected with a wire 100, connected with a terminal 101 of the transformer 89. It is thus seen that when the micro-switch 85 is actuated, the circuit will be closed and the metal parts arranged between the electrodes 37 and 49 will be subjected to the action of the welding current, while pressed together. The timer 98 controls the length of time that the welding process continues.

The operation of the machine is as follows:

In the starting of the operation, the electrode 37 is in the raised position and spaced from the lower electrode 49. The lever 72 is in the raised position and the roller 75 is resting upon the inclined cam face 74'. The arms 63 and 58 are in the lowered position. The parts to be welded are arranged in superposed relation between the electrodes 37 and 49. The lever 72 is swung downwardly and the cam 74 will now swing the arm 63 upwardly through the medium of the roller 75 and associated elements. The bolt head 66 now engages the leaf spring 69 moving it upwardly and the end of the leaf spring engages the bolt 70 moving it upwardly and swinging the arm 58 upwardly. The electrode 37 will then be moved downwardly and the parts to be welded are pressed together between the electrodes 37 and 49. The electrode 37 produces a resilient or yielding pressure against the parts to be welded, and the tension or stiffness of the spring 69 which controls this pressure has been previously adjusted to produce the desired pressure. As soon as the roller 75 travels upon the curved face 75' of the cam 74, the selected pressure upon the work is held constant, and at this time the welding circuit is closed by the bolt 80 depressing the roller 82 and closing the micro-switch 85 through the medium of the associated elements. During this welding period, the metal parts to be welded are plasticized and the leaf spring 69 will move the electrode 37 slightly toward the electrode 49, causing the pressure to follow through during the welding period.

The various parts of the apparatus, excepting those parts indicated as formed of insulating material, are preferably formed of metal. The rod 32 is thoroughly insulated from the rest of the machine, and this renders it possible to use the circuit shown in Figure 2.

In Figures 5 and 6, we have shown a rod 102, which we have substituted for the rod 32. This rod 102 is formed of metal and is held within the collar 51 and insulated therefrom. A generally horizontal resilient electrode 103 is provided, having one end clamped to the rod 102 and electrically connected therewith. The rod 102 is metal and the electrode 103 is formed of metal. The electrode 103 is tapered and is in the form of a leaf or blade, and has its free end arranged opposite the end of a companion electrode 104, mounted upon the rod 47, through the medium of the head 48 and associated elements, as described in connection with the electrode 49, in connection with the first form of the invention. The rod 102 has the wire 86 electrically connected therewith, as shown at 105. All other parts of the apparatus remain identical with those shown and described in connection with the first form of the invention.

The parts to be welded are arranged between the electrodes 103 and 104, and when the lever 72 is swung downwardly, the free end of the blade electrode 103 is moved downwardly to engage with the work between the electrodes. The welding circuit is closed when the blade electrode 103 is moved downwardly, and the selected pressure applied to the parts to be welded, and such parts are plasticized and welded and the pressure follows through during the welding period.

In Figures 7 and 8, we have shown a further modification of the invention. We have shown two pairs of upper and lower electrodes instead of one. The sleeve 56, Figures 7 and 8, is shown as equipped with two collars 51, receiving and holding the metal rods 32, which are insulated from these collars. Each rod 32 carries the shaft 34, equipped with the head 35, having the vertical electrode clamped therein. Arranged beneath each electrode 34 is the horizontal sleeve 43, carrying the shaft 47, provided with the head 48 having the lower electrode 49 clamped therein. The sleeve 55 has two horizontal arms 58 rigidly secured thereto, arranged at elevations beneath the rods 32 and in alignment with the rods. The tie-bar 59 has two horizontal arms 63 rigidly secured thereto, one arm 63 being disposed beneath and in alignment with each arm 58. The same leaf spring 69 and associated elements is used in connection with each pair of arms 63 and 58. All other parts of the apparatus remain identical with those shown and described in connection with the first form of the invention.

The leaf spring 69 used in connection with each arm 58 may have its tension individually adjusted, and hence different pressures may be applied to the work between different pairs of electrodes. The welding between the two pairs of electrodes is effected by swinging the lever 72 downwardly, since the downward movement of the lever will move the tie-bar 59 and both arms 63 upwardly.

Substantially the same welding circuit is employed. The wire 86, Figures 9 and 10, leads to one rod 32, while a branch wire 86' leads to the other rod 32. The wire 90 leads to one sleeve 43 while a branch wire 90' leads to the other sleeve 43. The circuit is otherwise identical with that shown and described in connection with the first and second forms of the invention.

It is to be understood that the forms of our invention herewith shown and described are to be taken as preferred examples of the same and that various changes in the shape, size and arrangement of parts may be resorted to without departing from the spirit of our invention or the scope of the subjoined claims.

Having thus described our invention, we claim:

1. In a welding machine, a support, a pivoted member mounted upon the support, an electrode holder mounted upon the pivoted member, a coacting electrode holder mounted upon the support, an arm connected with the pivoted member to move it in one direction, a leaf spring extending longitudinally of the arm and bearing against a part of the arm, means to hold the spring in place, a second pivoted arm mounted upon the support and including a part bearing against the leaf spring between the ends of the leaf spring, and means to move the second pivoted arm in one direction.

2. In a welding machine, a support, a pivoted member mounted upon the support, an electrode holder mounted upon the pivoted member, a coacting electrode holder mounted upon the support, an arm connected with the pivoted member to move it, a leaf spring extending longitudinally of the arm and bearing against the arm near one end of the leaf spring, means for holding the spring in place, a second pivoted arm mounted upon the support and extending longitudinally of the leaf spring, an element longitudinally adjustably mounted upon the second pivoted arm and engaging the leaf spring between its ends, and means to move the second pivoted arm in one direction.

3. In a welding machine, a pivoted supporting device including an electrode holder, an arm connected with the pivoted supporting device to move it in one direction, a leaf spring arranged near the arm and bearing against the arm to move it in one direction, pivoted means supporting the leaf spring and moving the same toward the arm, said pivoted means including an element contacting with the leaf spring and adjustable longitudinally of the leaf spring.

4. In a welding machine, a support, a pivot element mounted upon the support, a sleeve mounted upon the pivot element, means mounted upon the sleeve for holding an electrode, an arm mounted upon the sleeve to turn it, a second arm arranged near and extending longitudinally of the first arm, means to mount the second arm upon the pivot element, a leaf spring arranged between the first arm and second arm and carried by the second arm, an element carried by the second arm and engaging the leaf spring between the ends of the leaf spring, an element arranged near the free ends of the leaf spring and first arm to connect them, and means to move the second arm in one direction.

5. In a welding machine, a support, a pivoted supporting device including an electrode holder mounted upon the support, an arm connected with the pivoted supporting device to move it in one direction, a pivoted supporting means arranged near the arm, a leaf spring arranged near the arm and mounted upon the pivoted supporting means, the leaf spring bearing against the arm, an operating element mounted upon the pivoted supporting means, a pivoted cam to engage the operating element, and means to move the cam.

6. In a welding machine, a support, a member pivotally mounted upon the support to swing in a substantially vertical plane, an electrode holder mounted upon the member, an arm secured to the member to swing therewith, supporting means pivotally mounted upon the support to swing in a substantially vertical plane, said supporting means including an arm arranged beneath the first-named arm and extending longitudinally of the first-named arm, a leaf spring arranged between the first and second arms and mounted upon the supporting means, the second arm having a part engaging the leaf spring between its ends, the first arm having a part engaging the leaf spring near its free end, an operating element connected with the pivoted supporting means to shift the same, a cam pivotally mounted upon the support and having a generally radial face to engage and shift the operating element and a curved face concentric with the pivot of the cam, and means to move the cam.

7. In a welding machine, a support, a member pivotally mounted upon the support and having a socket, an electrode holder including a part adjustably mounted in the socket, a relatively stationary member mounted upon the support and having a socket, a second electrode holder including a part adjustably mounted in the second socket, an arm connected with the member to turn therewith, a pivoted supporting means mounted upon the support and including a second arm, a leaf spring mounted upon the pivoted supporting means and arranged between the arms, the second arm having a part engaging the leaf spring between the ends of the leaf spring and the first arm having a part engaging the leaf spring near the free end of the leaf spring, an operating element mounted upon the pivoted supporting means to swing the same, a cam pivoted upon the support near the operating element and have a generally radial face and a curved face concentric with the pivot of the cam, the faces engaging the operating element, and means to move the cam.

8. In a welding machine, a support, a substantially horizontal shaft mounted upon the support, a sleeve mounted upon the shaft to be turned upon its longitudinal axis, an electrode holder mounted upon the sleeve, a second electrode holder mounted upon the support, a substantially horizontal arm rigidly connected with the sleeve, a yoke having sleeves mounted upon the shaft, a second substantially horizontal arm rigidly mounted upon the yoke and arranged beneath the first-named arm and extending longitudinally thereof, a leaf spring arranged between the arms and having one end thereof attached to the yoke, a connecting part arranged between the free end portions of the leaf spring and first arm, an element carried by the second arm and engaging the leaf spring between its ends, an operating element mounted upon the yoke to swing the same, a lever pivoted upon the support, a cam operated by the lever and arranged near the operating element and including a generally radial face and a curved face concentric with the turning axis of the cam, a welding circuit connected with the electrode holders, and means operated by the lever to close the circuit when the curved cam face engages the operating element.

9. In a welding machine, a support, a substantially horizontal shaft mounted upon the support, a lever structure mounted between its ends upon the shaft to swing about the axis of the shaft, said lever structure including an electrode holding device arranged upon one side of the shaft and an arm arranged upon the opposite side of the shaft, a second arm arranged near and extending longitudinally of the first-named arm and mounted upon the shaft to turn about the axis of the shaft, a leaf spring mounted upon the second arm and extending longitudinally thereof, the first arm having a part arranged near its free end to engage with the free end of the leaf spring and the second arm having a part to engage with the leaf spring between the ends of the leaf spring, and means to swing the second arm upon its turning axis.

10. In a welding machine, a support, a substantially horizontal shaft mounted upon the support, a substantially horizontal lever structure mounted between its ends upon the shaft to swing about the axis of the shaft, said lever structure including an electrode holding device mounted upon one side of the shaft and an arm mounted upon the opposite side of the shaft, a substantially horizontal second arm arranged beneath and extending longitudinally of the first arm and mounted upon the shaft to turn about the axis of the shaft, a leaf spring mounted upon the second arm and extending longitudinally thereof, a pressure element carried by the second arm and engaging the leaf spring between the ends of the leaf spring, a pressure element carried by the free end of the first arm and contacting with the uppper face of the leaf spring and free from connection therewith, a keeper mounted upon the first arm and having a part arranged beneath the leaf spring to contact with the lower face of the leaf spring and free from connection therewith, a spring connected with the second arm to swing it downwardly, the first arm being swung downwardly by the leaf spring engaging with the keeper, an operating element connected with the second arm, and a substantially vertically swinging lever pivoted to the support and including a cam arranged near and beneath the operating element, said cam including a generally radial cam face and a curved cam face concentric with the pivot of the lever.

11. In a welding machine, a support, a shaft mounted upon the support, a lever structure mounted between its ends upon the shaft to swing about the axis of the shaft, said lever structure including an electrode holding device mounted upon one side of the shaft and an arm mountd upon the opposite side of the shaft, a resilient blade electrode mounted upon the electrode holding device, a second electrode arranged opposite the blade electrode, a holder for the second electrode mounted upon the support, a second arm arranged near and extending longitudinally of the first-named arm and mounted upon the shaft to turn about the axis of the shaft, a leaf spring mounted upon the second arm and extending longitudinally thereof, a pressure element mounted upon the second arm and bearing against the leaf spring between the ends of the leaf spring, a pressure element mounted upon the first arm and bearing against the leaf spring, an operating element connected with the second-named arm, a pivoted cam arranged to engage with the operating element, and means to move the cam.

12. In a welding machine, a support, a shaft mounted upon the support, a plurality of lever structures mounted between their ends upon the shaft to swing about the axis of the shaft, each lever structure including an electrode holding device mounted upon one side of the shaft and an arm mounted upon the opposite side of the shaft, a second lever structure mounted upon the shaft and including a plurality of second arms arranged near and extending longitudinally of the first arms, a leaf spring arranged near and extending longitudinally of each second arm and secured to the second lever structure, a pressure element mounted upon each second arm and engaging the adjacent leaf spring between its ends, a pressure element mounted upon each first arm and engaging the adjacent leaf spring, and means to move the second lever structure.

13. In a welding machine, a relatively stationary support, a pivoted supporting device mounted upon the relatively stationary support and including an electrode holder, a rigid arm mounted upon the pivoted supporting device to move the same, a leaf spring arranged near the arm and bearing against the arm at a point remote from the pivoted supporting device, pivoted supporting means mounted upon the relatively stationary support and having the leaf spring mounted thereon, and means to move the pivoted supporting means in one direction for moving the leaf spring toward the arm.

14. In a welding device, electrode holding devices, means to move at least one holding device with relation to the other holding device including pivotally connected first and second opposed arms, an elongated leaf spring arranged between the first and second arms and extending longitudinally thereof, the free end of the leaf spring bearing against the first arm, means to hold the leaf spring in place, and adjustable means to vary the tension of the free end portion of the leaf spring.

15. In a welding device, electrode holding devices, means to move at least one holding device with relation to the other holding device including pivotally connected first and second opposed arms, an elongated leaf spring arranged between the first and second arms and extending longitudinally thereof and having one end secured to at least one arm, an element mounted upon the first arm and adjustable transversely of it and engaging the free end portion of the leaf spring, and a tension element mounted upon the second arm and engaging the leaf spring inwardly of the element.

16. In a welding device, electrode holding devices, means to move at least one holding device with relation to the other holding device including pivotally connected first and second opposed arms, an elongated leaf spring extending longitudinally of the first and second arms and secured to at least one arm, the free end portion of the leaf spring bearing against the first arm, and a tension element longitudinally adjustably mounted upon the second arm and bearing against the leaf spring inwardly of the free end portion of such leaf spring.

17. In a welding device, electrode holding devices, means to move at least one holding device with relation to the other holding device including pivotally connected first and second opposed arms, an elongated leaf spring arranged between the first and second arm and having one end secured to at least one arm, the free end portion of the leaf spring bearing against the first arm, and a tension element longitudinally adjustably mounted upon the second arm and bearing against the leaf spring between its free end and secured end.

ALBERT F. PITYO.
HARRY E. BUTTERFIELD, JR.

REFERENCES CITED

The following references are of record in the file of this patent:

UNITED STATES PATENTS

| Number | Name | Date |
|---|---|---|
| 1,292,921 | Thornblade | Jan. 28, 1919 |
| 1,889,991 | Larsen | Dec. 6, 1932 |
| 2,464,054 | Panik | Mar. 8, 1949 |

FOREIGN PATENTS

| Number | Country | Date |
|---|---|---|
| 213,774 | Switzerland | June 3, 1941 |